UNITED STATES PATENT OFFICE.

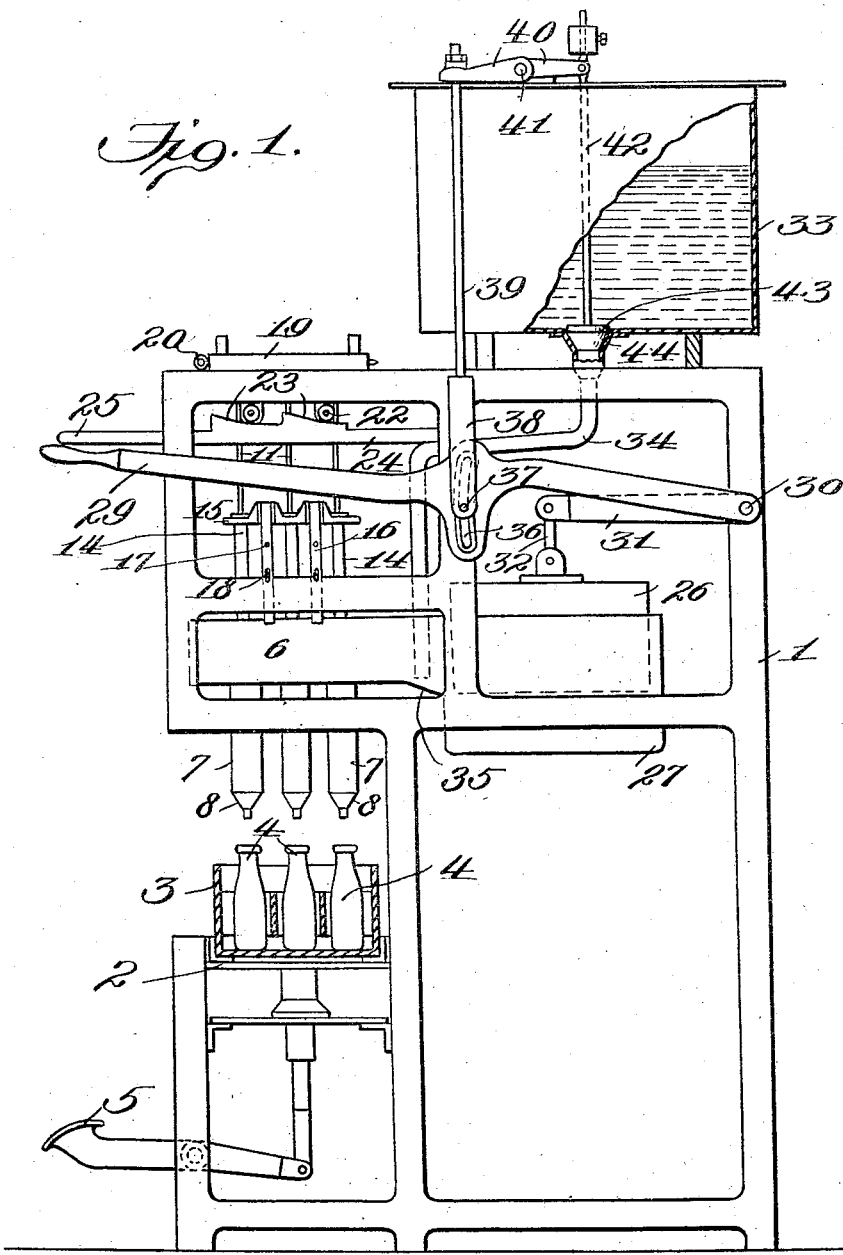

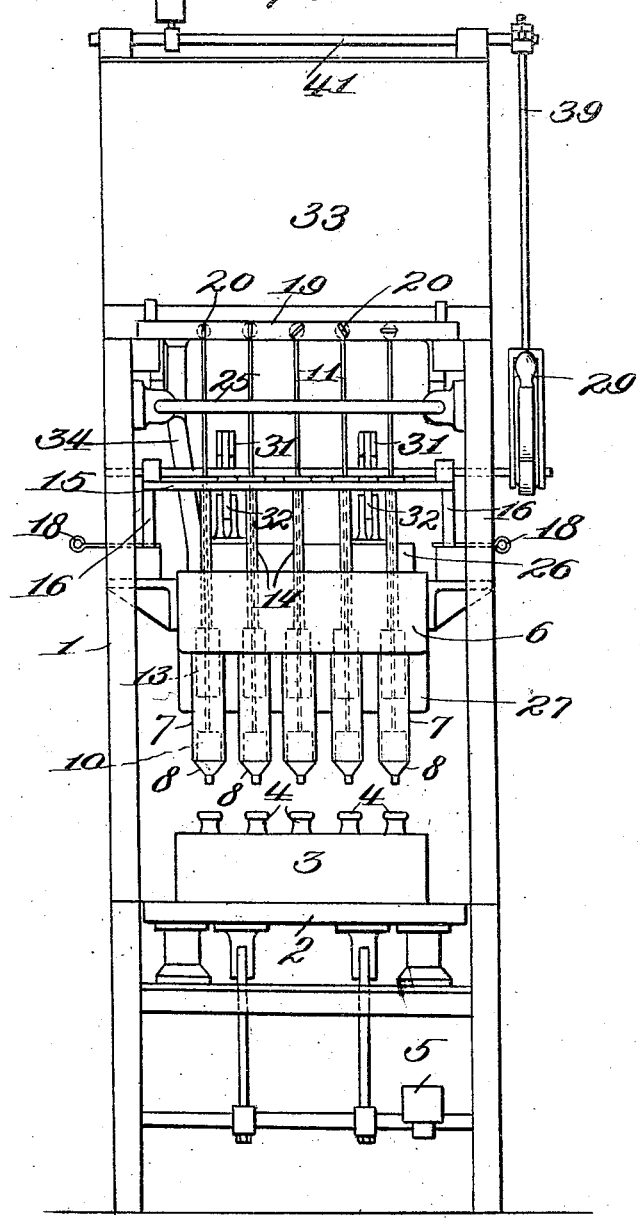

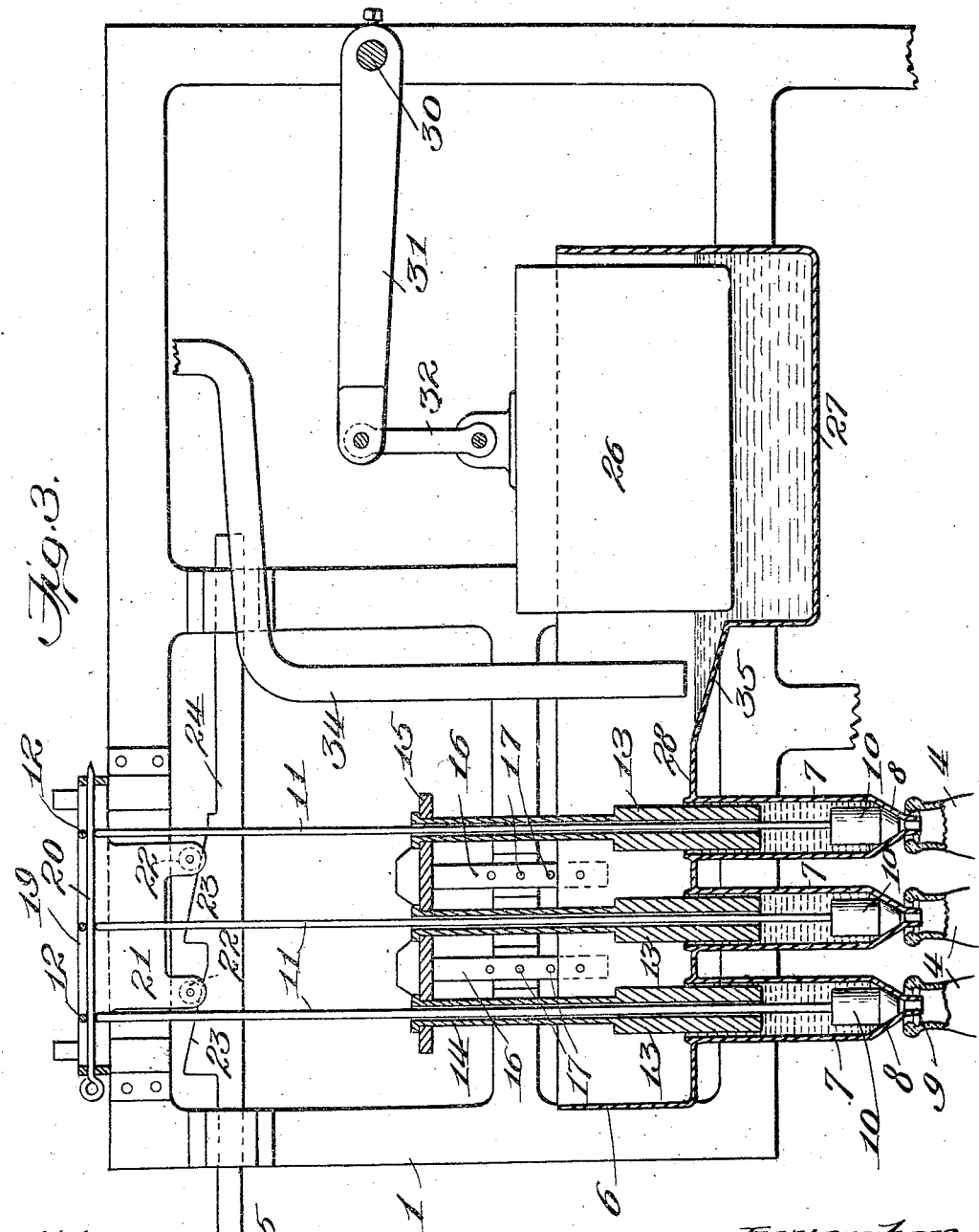

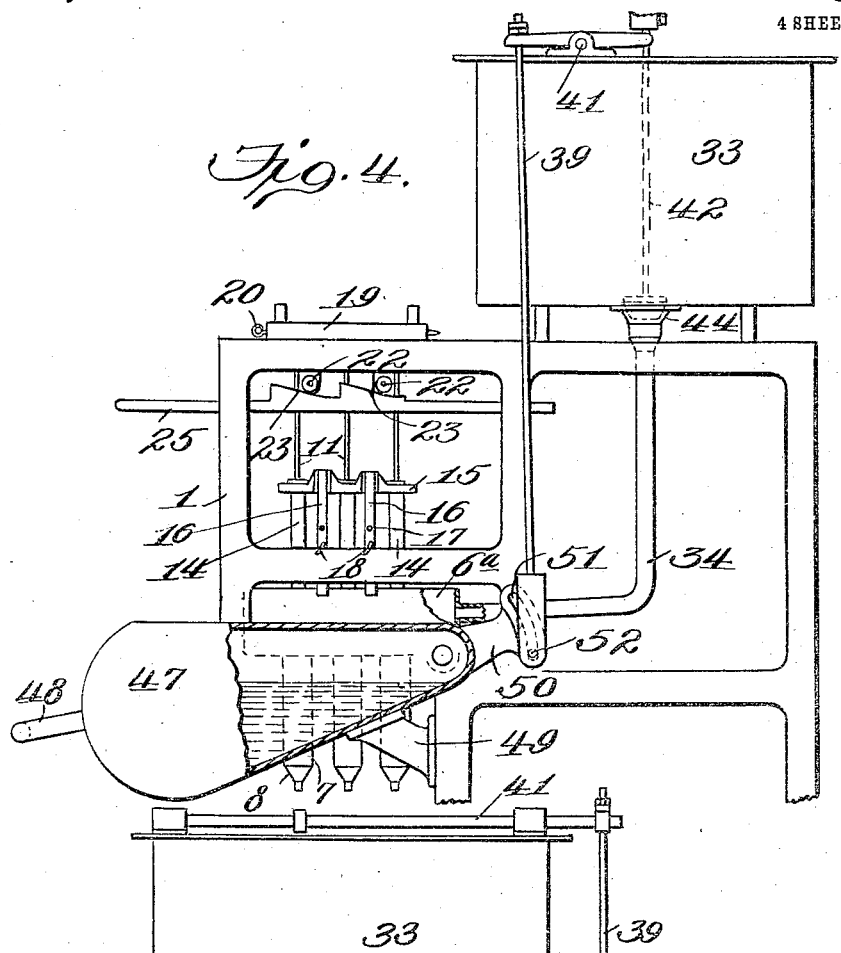
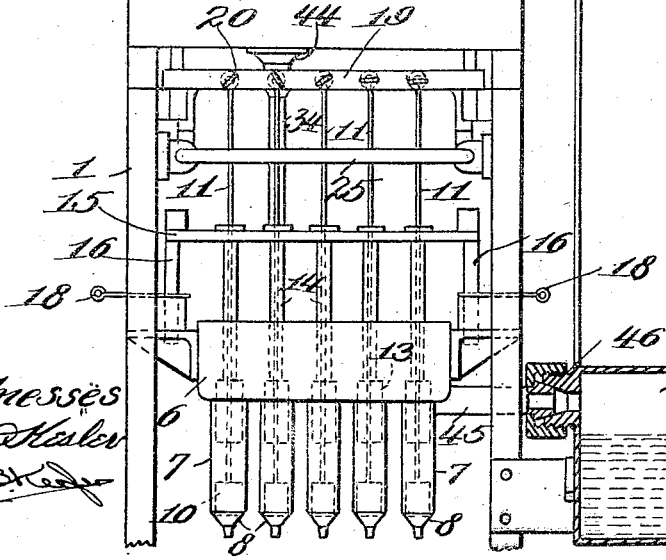

JOSEPH WILLMANN, OF DERBY, CONNECTICUT.

BOTTLE-FILLER.

969,017.  Specification of Letters Patent.  Patented Aug. 30, 1910.

Application filed January 13, 1909. Serial No. 472,088.

*To all whom it may concern:*

Be it known that I, JOSEPH WILLMANN, a subject of the Emperor of Germany, residing at Derby, in the county of New Haven and State of Connecticut, have invented new and useful Improvements in Bottle-Fillers, of which the following is a specification.

My present invention relates to improvements in bottle fillers and more especially to the class capable of filling measured quantities of liquid into bottles or other receptacles, and it has for its object primarily to provide an improved apparatus of this character whereby the charges of liquid supplied to the bottles may be accurately and automatically determined, the apparatus being capable of adjustment whereby the amounts of liquid supplied to the bottles may be varied as desired, the apparatus being especially advantageous when used in infant feeding depots wherein it is necessary to give to each infant an individual amount of milk and the milk being of a certain composition, the amount varying usually between one and eight ounces and ordinarily four formulas are used for milk of different grades.

Another object of the invention is to provide an apparatus of this class wherein the measuring devices for determining the amount of liquid to be supplied to each bottle are so constructed that each measuring device receives the exact amount of liquid which is to be discharged into the bottle, and before the measured liquid is discharged, the further supply of liquid to the measuring devices is interrupted and the surplus liquid is withdrawn during the discharging operation; hence, only the liquid that has been measured is discharged into the bottle.

Further objects of the invention are to provide a machine of this character having a supply tank for the liquid, such tank having a valve which is automatically operable from the same mechanism which causes the liquid to enter the measuring devices whereby the requisite quantity of liquid shall be supplied to the measuring devices although an excessive flow of the liquid is prevented; also to provide a bottle filler having a simple and effective means for varying the amounts of liquid measured and supplied to the bottles and furthermore to provide such a machine which has a plurality of filling devices whereby a crate of bottles may be filled simultaneously, although whenever it is desirable, any desired number of the filling devices may be set in an inoperative condition in order that a number of bottles less than the full capacity of the machine can be filled conveniently.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a side elevation of a bottle filler constructed in accordance with my present invention, portions of the liquid supply tank and the bottle crate being shown in section; Fig. 2 represents a front elevation of the machine as shown in Fig. 1; Fig. 3 represents an enlarged sectional view of the measuring and filling devices, and also the liquid controlling device whereby the level of the liquid may be raised and lowered in a manner to be hereinafter described; Fig. 4 is a side elevation of a portion of the machine as shown in Fig. 1, a pivoted tank however being shown for controlling the level of the liquid with reference to the measuring and filling devices; and Fig. 5 represents a front elevation of the upper portion of the machine as shown in Fig. 2, the same being equipped with a pivoted tank as shown in Fig. 4.

Similar parts are designated by the same reference characters in the several views.

In the accompanying drawing, I have shown a bottle filler which is especially adapted for use in the filling of milk bottles. It will be understood, however, that the machine either in whole or in part may be readily adapted for use in other connections, the invention not being limited to the specific forms shown as these are illustrated and described merely as two embodiments of the invention.

In that form of the invention shown in Figs. 1 to 3, inclusive, the machine comprises a frame 1 which may be of any appropriate construction and is provided with a vertically movable platform 2 to support a crate 3 wherein are located the bottles 4 to be filled, the vertically movable platform being elevated by means of a treadle 5 or any other suitable means. Above the platform which supports the bottles is mounted a filling tank 6 from the bottom of which depend a set of measuring and filling cups 7. These cups may vary in number, the number varying according to the maximum capacity of the machine. The lower end of each cup is contracted or of tapered or conical form as at 8 terminating in a reduced orifice 9 which is adapted to enter the corresponding bottle opening when the platform is elevated to carry the bottles into filling position. A valve plug 10 is arranged in the lower portion of each measuring and filling cup, the lower portion of each valve plug being shaped to fit the tapered or conical portion 8 of the respective cup and thereby form a seating that will control the discharge of the liquid from the cup. Each valve plug is supported by a rod 11 having an eye 12 at its upper end.

In order to vary the amount of liquid supplied to the bottles, each measuring and filling cup is provided with a device which is capable of varying the capacity thereof. In the present instance a displacer 13 is provided for each filling cup, it being in the form of a body which loosely surrounds the valve rod 11 and is capable of adjustment vertically in its respective cup, these displacers being so mounted as to permit the liquid to flow past them and into the lower portions of the cups, the displacers serving to increase or decrease the capacity of the respective cups as they are elevated or lowered. These displacers are provided with sleeves 14 which in turn are suspended from a supporting plate 15, and the latter in turn is provided at its opposite sides with slides 16 which are guided for vertical adjustment in the opposite sides of the machine frame and are provided with apertures 17 which are spaced at appropriate intervals vertically of the slides, and pins 18 are adapted to enter the appropriate apertures and to rest upon the corresponding sides of the frame so as to support the plate 15 in different elevated positions. These apertures 17 are spaced according to the different amounts of the liquid which it may be desirable to supply to the bottles, and by shifting the plate 15 to the proper elevation and supporting it in such position by the pins which enter the apertures 17, the displacers 13 will rest at such positions in the cups as correspond to the amounts of liquid that are to be supplied to the bottles.

A simple and efficient device is provided whereby all of the valve plugs may be simultaneously lifted so as to fill a full set of bottles or a portion of the valve plugs may be so lifted, the remainder being left closed whereby a smaller number of bottles may be filled. This device in its present form consists of a frame 19 which is guided to move vertically on the top of the frame and its opposite sides are pivoted to receive removable pins 20. The measuring and filling tubes are arranged preferably in rows, and a pin 20 passes through eyes in the valve rods of each row of filling devices thereby connecting the valve plugs to the frame 19. This frame has depending portions 21 provided with rollers or projections 22, these rollers or projections being arranged to coöperate with a pair of similar cams or wedges 23, the latter being formed on the upper sides of a pair of arms 24, the latter being slidable horizontally in suitable bearings at opposite sides of the frame and are connected by a transverse handle 25 whereby both arms with the wedges may be simultaneously reciprocated. As these arms 24 are moved toward the right as in Fig. 3, the frame 19 will be elevated thereby causing a lifting movement of each valve plug and a consequent discharge of the measured quantity of liquid in the corresponding cups. A reverse movement of the arms 24 will permit a descending movement of the frame 19 and a consequent closing of the valve plugs.

According to the present invention, the measuring and filling cups are supplied with the liquid only during the charging of the cups, and while the liquid is being discharged from these cups into the bottles, the supply of liquid is cut off from the cups.

In that form of the invention shown in Figs. 1 to 3, inclusive, a float 26 is provided, this float being arranged to operate in a rearward extension of the tank 6. This tank is provided with a depression 27 which is below the bottom 28 of the tank from which the measuring and filling cups depend and the depression is of such a capacity as to receive enough liquid to uncover the bottom 28 when the float 26 is elevated. On the other hand, as the float 26 is depressed, it will displace a sufficient amount of the liquid to cause it to cover the bottom 28 of the tank and to fill the measuring and filling cups. Any suitable means may be employed for operating the float, a lever 29 being provided in the present instance having a handle portion which is exposed toward the front of the machine or in convenient reach of the operator, and the rear portion of this arm is fixed to a shaft 30 which is journaled in the rear portion of the frame. This shaft also has an arm 31 fixed thereto and the arm is connected to the float by a link 32. A depression of the forward end of the lever 29 will cause a corresponding downward movement of the arm 31, and as the latter moves downwardly, it will operate through the link 32 to depress the float 26. A reverse movement of the lever 29 will cause elevation of the float 26 whereby the depression 27 in the tank 6 may receive the liquid which formerly covered the upper ends of the cups. The buoyancy of the float 26 is preferably sufficient to normally retain it and the lever 29 in elevated position as shown in Figs. 1 and 3. The tank 6 is supplied from time to time with additional liquid to take the place of that which is removed through the cups by a supply tank 33 which is preferably mounted at the upper portion of the apparatus and is provided with a discharge pipe 34 which enters the tank 6 preferably at a point adjacent to the depression 27 therein, an incline 35 being preferably provided immediately beneath the discharge end of the pipe 34 so as to direct the fresh liquid into the float chamber. The replenishing of the tank 6 with fresh liquid from the supply tank is preferably controllable from the lever 29 and in the present instance this result is accomplished by providing the lever 29 with an elongated segmental slot 36 in which operates a pin 37 carried by a slide 38 attached to the lower end of a rod 39, the latter being connected through the medium of the arms 40 and the shaft 41 to a vertical valve stem 42 which has a valve plug 43 on its lower end, this valve plug having a seat 44 surrounding the opening in the bottom of the supply tank 33 which communicates with the discharge pipe 34. When there is sufficient liquid in the tank 6 to fill all of the cups, the valve plug 43 will remain closed, as the lever 29 will descend sufficiently to elevate the level of the liquid in the tank 6 before the pin 37 reaches the end of the segmental slot 36 in the lever. Whenever necessary, however, the lever 29 may be depressed still further, the pin 37 being thereby engaged with the end of the slot 36 and operating through the rod 39 and arms 40 will cause the valve plug 43 to be lifted and thereby opened whereby an additional quantity of liquid will flow from the tank 33 into the tank 6.

Instead of employing the float for controlling the level of the liquid in the tank 6, the device shown in Figs. 4 and 5 may be used for the same purpose, if desired. In this form of the invention, a tank 6ᵃ is employed which is connected to the supply pipe 34, and a pipe 45 leads from the bottom of the tank 6ᵃ and communicates through a trunnion connection 46 with a pivoted tank 47, the latter being arranged at one side of the machine and is capable of a pivotal movement in a vertical plane, a handle 48 being provided on this tank toward the front of the machine whereby the tank may be manipulated with facility by the operator. This pivotal tank 47 has a capacity sufficient to receive all of the liquid which is contained in the tank 6ᵃ during the filling of the cups so that when this tank is lowered, as shown in Fig. 4, the tank 6ᵃ will be emptied. A rest 49 is provided for supporting the pivoted tank in its normal depressed position. During the filling of the cups, however, the tank 47 is elevated by means of the handle 48 whereby the liquid contained in this pivoted tank will flow through the trunnion connection 46 and the pipe 45 into the tank 6ᵃ so that the upper ends of the cups will be covered with the liquid and uniform filling of the cups is thereby insured. The replenishing of the liquid for the tank 6ᵃ is also controlled by the pivoted tank 47, this tank in the present instance having a rearwardly extending arm 50 thereon which is provided with a segmental slot 51, the latter coöperating with a pin 52 which is carried on the lower end of the rod 39 as in the previous construction. When the tank 47 is in its lowered position as shown in Fig. 4, the valve in the supply tank will be closed, but when the tank 47 is lifted beyond a given point, the pin 52 will reach the upper end of the slide 51 and the valve for the supply tank will be opened permitting a fresh supply of liquid to flow from the tank 33 into the tank 6ᵃ.

An apparatus constructed in accordance with my present invention may be operated with facility. The bottles to be filled may be conveniently placed in the crate 3, the latter being mounted on the vertically movable platform 2. The milk of the desired composition is supplied to the tank 33 and, on the initial starting of the machine, the lever 29 or the tank 47 as the case may be, is depressed whereby the valve plug 43 will be opened and a sufficient quantity of the milk or liquid will flow from the tank 33 into the tank 6 or 6ᵃ.

In operating a machine constructed in accordance with that form shown in Figs. 1 to 3, inclusive, the treadle 5 may be first depressed so as to carry the bottles into filling position beneath the respective cups. The lever 29 may next be depressed whereby the float 26 will enter the depression 27 of the tank 6 and will thereby elevate the level of the liquid in the tank 6 until such liquid covers the upper ends of the cups. Assuming that the displacers 13 have been adjusted to the desired elevation according to the amount of liquid to be measured and filled into the bottles, the liquid while its level is elevated will flow into and fill the spaces in the several cups, and after the cups have been filled, the lever 29 is returned to its normal elevated position, the float 26 rising and thereby causing the level of the liquid to fall sufficiently to uncover the tops of the cups. The handle 25 may then be pushed inwardly or toward the right, the cam portions 23 coöperating with the rollers or projections 22 on the frame 19 whereby the latter will be elevated whereupon the valve plugs 10 will be lifted, permitting the contents of the cups to discharge into the respective bottles. After the bottles have received their respective charges, the handle 25 is returned to its normal position and the crate of filled bottles may be lowered and removed. After a fresh supply of bottles have been mounted upon the platform 2, the same cycle of operations may be repeated. Whenever it is desirable to fill a number of bottles less than the number of cups with which the machine is equipped, one or more of the pins 20 is removed, the corresponding valve plugs remaining in closed position while the machine is being operated so that no liquid will discharge from such cups until the pins 20 are replaced. The quantities of milk or other liquid to be filled into the bottles may be regulated or adjusted as previously described by varying the elevation of the plate 15 which supports the displacers 13.

In that form of the machine shown in Fig. 4, the handle 48 of the pivoted tank 47 is operated in the same manner as the lever 29, the handle 48 being lifted so as to transfer the liquid from the tank 47 into the tank 6ª during the filling of the cups, and immediately after the filling, the tank 47 is lowered whereupon the liquid will flow from the tank 6ª to the tank 47 and the contents of the cups may then be discharged in the same manner as described in connection with that form of the invention shown in Figs. 1 to 3, inclusive.

Bottle fillers constructed in accordance with the present invention are relatively simple in construction and are composed of a few parts all of which may be readily removed or otherwise reached for the purposes of sterilization or cleansing, this being of essential importance in the bottling of milk. By my invention, either a full set of bottles may be filled simultaneously, or a reduced number may be filled in which case the remainder of the filling cups will be closed during the operation of the machine. Obviously, the quantities of milk or other liquid to be supplied to the bottles may be quickly adjusted, it being only necessary to elevate or depress the displacers so as to give to the respective cups a capacity equal to the amount of liquid which the bottles are to receive.

By raising the level of the liquid in the filling tank during the charging or filling of the cups and lowering such level so that the supply of liquid to the cups is interrupted during the discharging of the liquid from the cups into the bottles, accuracy in the measuring of the liquid is insured, and this feature is materially advantageous when the apparatus is used in the feeding of milk to infants. I have shown two different means for controlling the supply of the liquid to the cups, one involving a movable tank which is auxiliary to the filling tank and serves by its movements to transfer the liquid back and forth, and the other means involving a depression which also is, in effect, a tank auxiliary to the filling tank, and a float or other body is operable to transfer the liquid from one tank to the other. Either of these forms may be preferred and, moreover, other means than those shown may be used to secure the desired result. The automatic means for replenishing a supply of liquid to the cup filling tank enables the apparatus to operate with certainty, and the entire apparatus may be operated with the greatest facility.

I claim as my invention:

1. A bottle filler comprising a stationary filling tank having a cup communicating therewith and adapted to receive and discharge liquid into bottles, displacing means for maintaining liquid in said tank at an increased elevation during the filling of said cup and for lowering the level of such liquid before the discharge of liquid from the cup, a supply tank for replenishing liquid in the filling tank and having a controlling valve, and a common operating connection between said displacing means and valve.

2. A bottle filler comprising a stationary filling tank, a valved cup for receiving liquid from the filling tank and discharging it into bottles, displacing means movable with respect to the filling tank for elevating the liquid in said tank during the filling of the cup and lowering the elevation of the liquid in such tank before the discharge of liquid from the cup, a supply tank for replenishing liquid in the filling tank, a controlling valve for said supply tank, and an operative connection between said valve and displacing means which permits a limited independent operation of the displacing means and serves as common operating means for both.

3. A bottle filler comprising a filling tank, devices for receiving liquid from said tank and discharging it into suitable receptacles, displacing means movable relatively to said tank for maintaining liquid therein at an increased elevation during the charging of said filling devices and for lowering the elevation of such liquid before the discharge of liquid from such devices, a liquid supply tank adapted to replenish the liquid in the filling tank, a valve controlling the flow of liquid from the supply tank, and an operative connection between the displacing means and said valve for opening the latter when the displacing means is at one limit of its movement.

4. A bottle filler comprising a filling tank, a cup depending therefrom for receiving liquid from such tank and discharging it into bottles, means movable relatively to said tank and communicating therewith for maintaining the liquid in such tank at an increased elevation during the filling of said cup and for causing the withdrawal of such liquid prior to the discharge of liquid from the cup, a supply tank connected to discharge liquid into the filling tank, a controlling valve for the supply tank, and an operative connection between said means and valve for permitting limited independent operation of said means and for causing simultaneous movement of said means and valve.

5. A bottle filler comprising a tank, a bottle filling device communicating therewith and adapted to receive liquid from the tank and to discharge it into bottles, a part communicating with and normally located below the level of said tank, and a device movable relatively to said tank and arranged to act upon the liquid to maintain the liquid at an increased elevation in said tank during the filling of said device and for withdrawing said liquid into said part communicating therewith during the discharging of said device.

6. A bottle filler comprising a filling tank, a set of cups depending from the bottom thereof and provided with valves whereby they may receive liquid from said tank and discharge it into bottles, a tank auxiliary to the filling tank and having means capable of transferring liquid therefrom into the filling tank and maintaining the liquid in said tank at an increased elevation during the filling of said cups and for withdrawing the liquid from the filling tank before the emptying of said cups, said auxiliary tank being normally below the level of the filling tank.

7. A bottle filler comprising a filling tank, bottle filling cups connected to receive liquid therefrom and to discharge such liquid into bottles, means for maintaining liquid in the filling tank during the charging of said cups and for withdrawing such liquid during the emptying thereof, a supply tank for replenishing the liquid to the filling tank, and a valve controlled by said means for regulating the flow of liquid from the supply tank.

8. A bottle filler comprising a filling tank, a set of bottle filling cups connected to receive liquid from said tank and to discharge it into bottles, a device operable to maintain liquid in the filling tank during the charging of said cups and for withdrawing such liquid from the tank during the emptying thereof, a supply tank communicating with the filling tank, a valve for controlling the flow of liquid from the supply tank, and means operable by said device for regulating the supply of liquid in the filling tank.

9. A bottle filler comprising a filling tank, a set of cups connected to receive liquid from said tank and to discharge it into bottles, a part operable to maintain liquid in said tank during the filling of said cups and for withdrawing such liquid during the discharging thereof, a liquid supply tank communicating with the filling tank, a valve for the supply tank, and an operative connection between said valve and device whereby the latter is capable of a predetermined operation without actuating the said valve.

10. A bottle filler comprising a filling tank, a set of bottle filling cups connected to receive liquid from such tank and to discharge it into bottles, a liquid controlling device for maintaining liquid in said filling tank during the charging of said cups and for withdrawing such liquid during the discharging of the cups, and means operable by said liquid controlling device for replenishing the liquid supplied to said filling tank.

11. A bottle filler comprising a filling tank, a set of bottle filling cups connected to receive liquid from such tank and to discharge it into bottles, a liquid controlling device for maintaining liquid in the filling tank during the charging of said cups and for withdrawing such liquid during the emptying thereof, a supply tank communicating with the filling tank and having a valve, and an operative connection between the liquid controlling device and said valve whereby the liquid controlling device may be normally operated independently of said valve and an abnormal movement of said device will open said valve.

12. A filling device of the class described comprising a filling tank, a measuring cup depending from the bottom thereof, a valve located in the bottom of said cup and provided with an upwardly extending reciprocatory stem, and a displacer depending loosely within the cup and fitting loosely around said stem whereby the capacity of the cup may be regulated, and the valve may be operated while the displacer is stationary.

13. A filling apparatus comprising a filling tank, a measuring cup depending therefrom, a valve arranged in the bottom of said cup and provided with an upwardly extending reciprocatory stem, a displacer depending loosely in said cup and loosely surrounding the valve stem, and an adjustable support carrying said displacer, the displacer being capable of adjustment independently of the valve to vary the capacity of the cup, and the valve being capable of operation while said displacer remains stationary.

14. A filling apparatus of the class described comprising a cup, a valve controlling the same and provided with a valve stem, a filling tank communicating with the cup, a displacer surrounding but independent of the valve stem and adjustable axially thereof for varying the capacity of the cup, and means for adjustably supporting the displacer independently of said valve stem.

15. A filling apparatus of the class described comprising a filling tank, a set of bottle filling cups depending therefrom, valves controlling the discharge ends of said cups, a set of displacers for the respective cups whereby the capacities thereof may be varied, and a device connected to all of the displacers of the set and adjustable to simultaneously vary the capacities of the cups independently of said valves.

16. A filling apparatus of the class described comprising a filling tank, a set of bottle filling cups communicating therewith and arranged in groups, valves arranged in the discharge ends of the cups and provided with valve rods, a reciprocatory frame having cams thereon for opening and closing said valves, an actuating frame coöperative with said cams and detachable connections between said valve actuating frame and the valve rods whereby certain groups of the valves may be operated independently of the others.

17. A filling apparatus of the class described comprising a filling tank, a set of bottle filling cups connected to receive liquid therefrom and arranged in a plurality of rows, valves for the respective cups having valve rods, an actuating frame movable axially of the valves, and pins for detachably connecting the valve rods for the different rows of cups to said frame whereby either all or a portion of the valves may be operated thereby.

18. A filling device of the class described comprising a set of bottle filling cups, means for supplying liquid thereto, valves for the respective cups, an actuating frame operatively connected to the valves and movable parallel to the axes thereof, and a part having cams movable transversely of the direction of movement of said frame whereby the latter may be operated to open and close the valves.

In testimony whereof I have hereunto set my hand in presence of two subscribing witnesses.

JOSEPH WILLMANN.

Witnesses:
Wm. McKenna,
E. J. Horton.